United States Patent Office 3,494,971
Patented Feb. 10, 1970

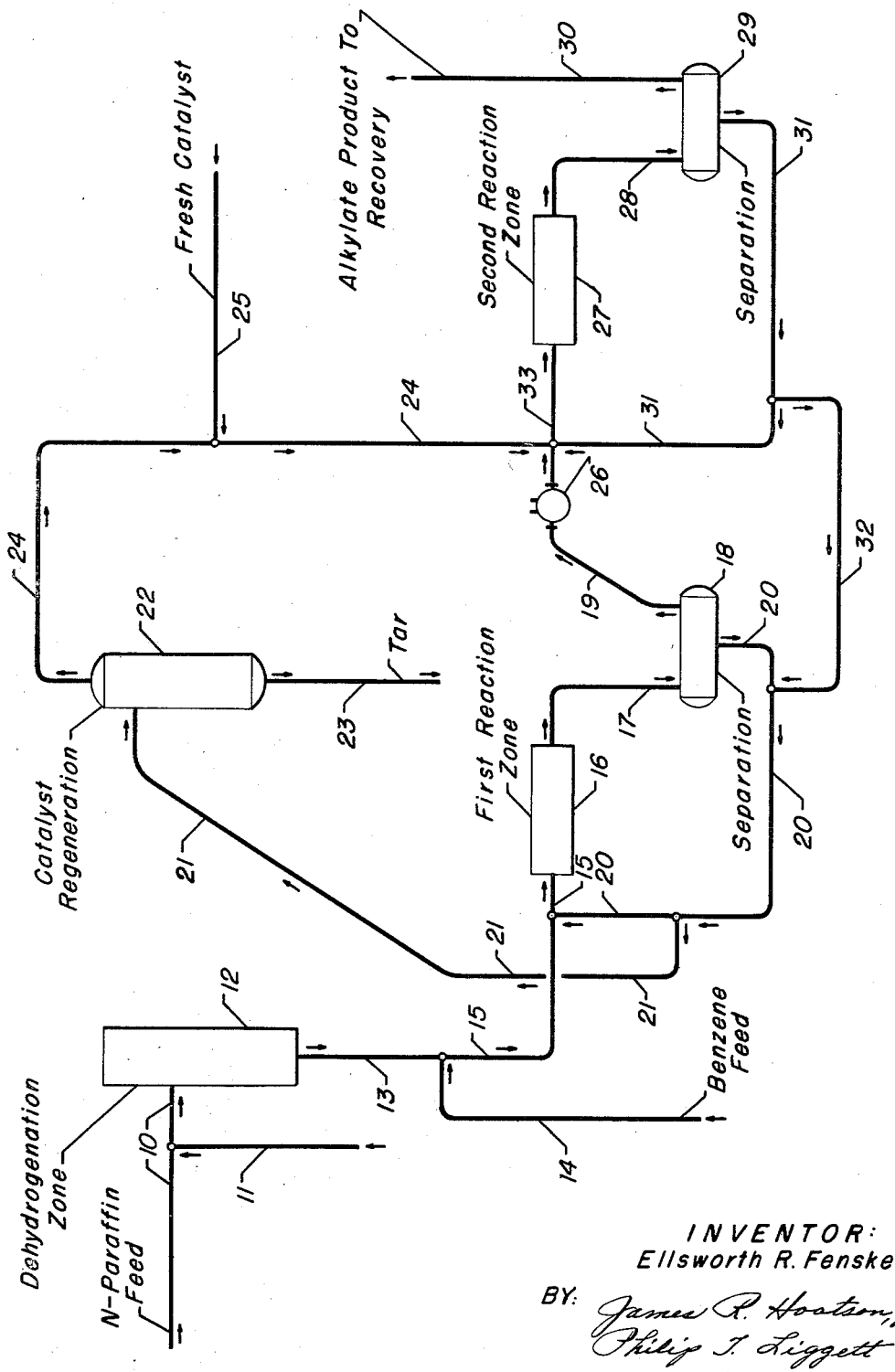

3,494,971
PROCESS FOR THE PRODUCTION OF A MONO-ALKYLATED AROMATIC HYDROCARBON
Ellsworth R. Fenske, Palatine, Ill., assignor to Universal Oil Products Company, Des Plaines, Ill., a corporation of Delaware
Continuation-in-part of application Ser. No. 625,495, Mar. 23, 1967. This application Apr. 18, 1969, Ser. No. 817,534
Int. Cl. C07c 3/52, 15/02
U.S. Cl. 260—671                        6 Claims

ABSTRACT OF THE DISCLOSURE

Process for producing monoalkylated aromatic hydrocarbon having a bromine index of less than 30 suitable for conversion to a detergent product. The reaction between the aromatic and linear mono-olefinic hydrocarbon takes place in successive stages using hydrogen fluoride as the catalyst. The hydrogen fluoride alkylation catalyst employed in the first such stage has been previously used in the second stage and is therefore an equilibrium catalyst containing contaminants such as tars. The catalyst employed in the second stage is fresh or regenerated acid catalyst.

CROSS REFERENCE TO RELATED APPLICATION

This application is a continuation-in-part of my co-pending application Ser. No. 625,495 filed Mar. 23, 1967, and now abandoned.

BACKGROUND OF THE INVENTION

This invention relates to an alkylation process. It particularly relates to a process for producing the reaction product between an aromatic and a linear mono-olefinic hydrocarbon of from 10 to 15 carbon atoms per molecule. It specifically relates to the production of monoalkylated aromatic hydrocarbon having a bromine index of less than 30 suitable for conversion to a detergent product.

It has long been known that the satisfactory disposal of sewage and the inactivation of detergents dissolved in the sewage is a difficult but extremely necessary processing problem. Many of the detergents, for example, those having an alkylaryl structure as the organic portion tends to produce stable foams in hard or soft waters in such large quantities that the foam clogs sewage treatment facilities and often appears in sufficient concentration in the treatment facilities to destroy the bacteria necessary for sufficient biological action for proper sewage treatment. The prior art has also known that the alkylbenzene sulfonates (ABS) detergents which are based on using propylene-tetramer as the alkylating agent for benzene, is relatively non-biodegradable and therefore usually undesirable in current sewage treatment plants. On the other hand, the prior art has also known that biodegradable linear alkylbenzene sulfonates (LAB) are extremely satisfactory and most desirable in the commercial market today. Present methods for producing the biodegradable detergents utilize normal paraffins as a source of the straight chain alkyl substituents. Heretofore, the prior art processing schemes for producing LAB have included: chlorination followed by direct alkylation of benzene with alkylchlorides using aluminum chloride as the catalyst; chlorination followed by dehydrochlorination and alkylation of benzene with the resultant olefins using an acid catalyst; and the cracking of higher molecular weight paraffinic hydrocarbons such as waxes to form suitable olefins which are then used to alkylate benezne with an acid catalyst.

It can thus be seen that the most popular prior art schemes involve several rather complicated processing steps. However, more recently there has been a process announced in which the normal paraffins are made in sufficient purity for direct catalytic dehydrogenation of the n-paraffins to the corresponding n-mono-olefins of the same carbon number. Basically, this most recent prior art process involves the extraction of, for example, kerosene to produce n-paraffins of extremely high purity. These high purity n-paraffins are catalytically dehydrogenated to n-olefins. The dehydrogenation effluent is admixed with benzene and converted to alkylbenzene in the presence of an acid catalyst such as hydrogen fluoride. The alkylation effluent is separated into linear alkylbenzenes and a by-product heavy alkylate. The excess n-paraffins are usually recycled to the dehydrogenation section. Similarly, any excess benzene is recycled to the alkylation reaction zone.

The present invention is an improved method for performing the alkylation reaction of, for example, the hereinabove described most recent prior art method for producing biodegradable linear alkylbenzene sulfonates.

SUMMARY OF THE INVENTION

Therefore, it is an object of the present invention to provide a process for producing the reaction product between an alkylatable aromatic hydrocarbon and an alkylating agent in the presence of hydrogen fluoride alkylation catalyst.

It is another object of this invention to provide a process for producing a monoalkylated aromatic hydrocarbon having a bromine index of less than 30 suitable for conversion to a detergent product.

It is a specific object of this invention to provide a process for producing a monoalkylated aromatic hydrocarbon having a bromine index less than 30 suitable for conversion to a detergent product in a more facile and economical manner.

According to the present invention there is provided a process for the production of a monoalkylated aromatic hydrocarbon having a bromine index of less than 30 which comprises the steps of: (a) alkylating at alkylation conditions including a temperature in the range of from 40° F. to 120° F. an aromatic hydrocarbon with a linear mono-olefinic hydrocarbon of from 10 to 15 carbon atoms per molecule in a first alkylation reaction zone containing hereinafter specified used hydrogen fluoride alkylation catalyst so that at least 98% by weight, but less than 100% by weight of said mono-olefinic hydrocarbon is reacted; (b) passing the entire first alkylation reaction effluent into a first separation zone under conditions sufficient to produce a hydrocarbon-containing phase and a used hydrogen fluoride alkylation catalyst-containing phase; (c) recycling a major portion of the separated used hydrogen fluoride alkylation catalyst-containing phase to the first alkylation reaction zone of step (a) and passing the remaining portion of said catalyst-containing phase into a hydrogen fluoride catalyst regeneration zone to produce a fresh hydrogen fluoride alkylation catalyst having a concentration of from 90 to 100% by weight hydrogen fluoride; (d) introducing the separated hydrocarbon-containing phase of step (b) and the fresh hydrogen fluoride alkylation catalyst of step (c) into a second alkylation reaction zone maintained at alkylation conditions including a temperature in the range of from 80° F. to 150° F., said temperature being at least 10° F. higher than the temperature maintained in said first alkylation reaction zone, thereby completely reacting the remaining mono-olefinic hydrocarbon; (e) passing the entire second alkylation reaction effluent into a second separation zone maintained under conditions sufficient to separate monoalkylated aromatic hydrocarbon having a bromine index of less than 30 from a second used hydrogen fluoride alkylation catalyst phase; (f) recycling a portion of the separated second used hydrogen fluoride alkylation catalyst phase of step (e) to said second alkylation reaction zone in admixture with the fresh hydrogen fluoride alkylation catalyst of step (c) and recycling the remaining portion of said second used hydrogen fluoride alkylation catalyst to said first alkylation reaction zone in admixture with said used hydrogen fluoride catalyst of step (c) to form the used hydrogen fluoride alkylation catalyst of step (a); and, (g) recovering monoalkylated aromatic hydrocarbon having a bromine index of less than 30.

Thus, in a process for producing a monoalkylated aromatic hydrocarbon having a bromine index of less than 30 that is suitable for conversion to a detergent product wherein a plurality of reaction zones in series flow are utilized and a hydrogen fluoride alkylation catalyst is admixed with aromatic hydrocarbons and linear mono-olefinic hydrocarbons of from 10 to 15 carbon atoms per molecule under alkylation conditions in said zones the present invention provides an improvement which comprises contacting said aromatic hydrocarbons and said olefin hydrocarbons with hydrogen fluoride alkylation catalyst in at least two successive stages; the catalyst employed in the first such stage having previously been used in the second stage and being partially spent from such use; and the catalyst being employed in the second stage being fresh catalyst; said contacting being performed under specific alkylation conditions; and recovering a monoalkylated aromatic hydrocarbon having a bromine index of less than 30 from the effluent of the second stage.

The feedstock for the alkylation reaction of the present invention is primarily a linear mono-olefin which, preferably, has been prepared by the direct dehydrogenation of its corresponding n-paraffinic analog. Typically, the olefin feedstock to the alkylation reaction contains from 10 to 15 carbon atoms per molecule, preferably, from 11 to 14 carbon atoms per molecule. This linear mono-olefin is utilized as the alkylating agent for the alkylatable aromatic hydrocarbon. Suitable aromatic hydrocarbons include benzene, toluene, xylene, ethylbenzene, methylethylbenzene, diethylbenzene, and mixtures thereof. The preferred aromatic hydrocarbon for use in my invention is benzene. By operating in the manner taught by the present invention, exceptionally high yields of the desired monoalkylated aromatic hydrocarbon may be obtained.

The alkylation reaction, in both stages, is effected in the presence of hydrogen fluoride alkylation catalyst. It is preferred that hydrogen fluoride alkylation catalyst passing to the second alkylation reaction zone have a concentration of at least 90% by weight of hydrogen fluoride, and preferably, a concentration frame 90 to 100% by weight of hydrogen fluoride.

It is to be noted that one of the essential concepts of the present invention involves the utilization of catalyst in the first alkylation reaction zone which has been previously used in the second alkylation reaction zone. Thus, in effect, the catalyst is flowing in counter-current manner to the flow direction of the hydrocarbon reactants. It is also essential to my invention that the second alkylation reaction zone is operated at a temperature that is at least 10° F. higher than the temperature maintained in the first alkylation reaction zone. By maintaining a lower temperature in the first alkylation reaction zone, undesirable side reactions such as polymerization reactions are minimized. Further, it was found that the low temperatures desirable for the first stage reaction had the effect of producing undesirable quantities of alkylfluorides which act as a contaminant in the hydrocarbon product produced. These alkylfluorides produce color impurities in the final detergent product obtained from the alkylate when the latter is sulfonated for the production of an alkylbenzene sulfonate detergent. Accordingly, the higher temperature maintained in the second alkylation reaction zone at least partially decomposes any alkylfluorides, thereby producing a reaction product of extremely high purity and in exceptionally high yield. In addition, it must be noted that the detergent industry requires that the LAB be produced in exceptionally clear color and in the substantial absence of olefinic contaminants. Accordingly, the monoalkylated aromatic hydrocarbon must also be of exceptionally good color and exceptionally low in olefin content. Accordingly, the bromine index of the alkylate produced must be less than 30 and, preferably, should be approximately 10; although, in some cases a bromine index of from 10 to 20 may be satisfactory. As a rough calculation, those skilled in the art known that the numerical value of the bromine index is approximately equal to the parts per million (p.p.m.) of olefin hydrocarbons present in the product. It has been found that satisfactory color sulfonates may be produced if the mono-alkylate has an APHA color of less than 15 and, preferably, less than 10. Typically, in the practice of this invention, the desired monoalkylated aromatic hydrocarbon produced will have an APHA color of about 5.

As will become evident from the operating conditions presented hereinbelow it is extremely desirable to operate the first stage alkylation zone of the present invention so that the consumption of the n-olefin alkylating agent is substantially complete. By this is meant that the olefin hydocarbon should be consumed to an extent of at least 98% by weight, but less than 100%. In similar manner, the operating conditions of the second stage of alkylation should be chosen so that the remaining olefin agent is completely consumed and any alkylfluoride compounds present in the effluent from the first stage be at least partially decomposed. In a typical operation of the present invention, the olefin hydrocarbon is ultimately consumed in an amount of 99.9% by weight.

It was found that by operating in the manner of the present invention that the second stage reaction was an exceptionally clean reaction in that only a small amount of tar contaminant was produced in the catalyst phase thereby reducing to a minimum the chances of contaminating the desired monoalkylated aromatic hydrocarbon product with off-color material such as entrained tar and/or polymerization products. In addition, it was found that the partially deactivated acid catalyst from the second stage reaction was eminently suitable to perform the catalytic reaction required in the first stage reaction zone, to wit: effecting a substantially complete reaction between the linear mono-olefinic hydrocarbon and the aromatic hydrocarbon.

In the practice of the present invention it is essential that the temperature in the first alkylation reaction zone be maintained at least 10° F. lower than the temperature in the second alkylation reaction zone either by suitable heat exchange means, such as water cooling within the reactor, or by prechilling the reactants and catalyst so that the reaction medium will be at the appropriate low temperature. Thus, the operating conditions in the first reaction zone include a temperature from 40° F. to 120° F., typically, about 100° F.; a residence time from 5 minutes to 25 minutes, typically, about 15 minutes; and hydrogen fluoride alkylation catalyst-to-hydrocarbon volume ratio of from 0.2:1 to 10:1, typically, about 2:1. In order to maximize the production of the desired monoalkylated aromatic hydrocarbon from the alkylating agent charged to the process, it is generally preferred that the molor ratio of aromatic compound-to-alkylating agent be greater than 1:1 and, more preferably, within the range from about 2:1 to about 15:1 mols per mol. Alternatively, it is distinctly preferable that a molar ratio of aromatic hydrocarbon-to-(olefin hydrocarbons plus alkylate product) be maintained at least as high as 3:1 and typically, should be about 8:1. The upper limit for this ratio, of course, will be dictated by the economics of the process.

As previously set forth, the operating conditions for the second alkylation reaction zone include a temperature in the second alkylation reaction zone that must be at least 10° F. higher than the temperature maintained in the first reaction zone. Accordingly, these operating conditions include a temperature from 80° F. to 150° F., typically about 120° F.; a residence time from 5 minutes to 25 minutes, typically, about 15 minutes; and an acid catalyst-to-hydrocarbon volume ratio of from 0.2:1 to 10:1, typically, about 1:1. The aromatic hydrocarbon-to-(olefin hydrocarbon plus alkylate product) ratio should be maintained greater than 2:1 in the second reaction zone, and, typically, will be about 7:1.

With reference to the acidity of the catalyst in the practice of this invention, the control for acidity should be the weight percent acid in the drag stream charged to the catalyst regeneration zone, as more fully discussed with reference to the appended drawing which is a schematic representation for apparatus for practicing one embodiment of this invention. The acidity of the acid catalyst in the first alkylation reaction zone may be from 86% to 92% by weight and, typically, will be about 90%. Acidities above and below this range may in some cases be used satisfactorily; although, in virtually no case should the acidity of the acid in the first alkylation reaction zone be allowed to drop below about 83% by weight. Similarly, for the second reaction zone the acidity of the acid catalyst should be greater than 90%, say, from 93% to 100% by weight, and typically, will be between 93% and 94% by weight. As used herein for convenience, it is to be noted that the term "fresh catalyst" is intended to embody both new catalyst brought in external to the process as well as regenerated catalyst coming from the catalyst regeneration zone. Preferably, the catalyst passed to the catalyst regeneration zone will be about 90% by weight so that the regenerated catalyst can conveniently be obtained at a concentration of about 94% by weight hydrogen fluoride.

The invention may be more fully understood from the following illustrative discussion with reference to the appended drawing.

DESCRIPTION OF THE DRAWING

Referring now to the drawing, an n-paraffin hydrocarbon stream having a purity of about 98% and a carbon number range from 11 to 14 is passed into the process via line 10 where, if desirable, it is admixed with additional recycle n-paraffin feed from line 11. The entire feed stream is passed into dehydrogenation zone 12 which is a fixed bed catalytic unit operating at relatively mild conditions of temperature and pressure. For example, the operating conditions for dehydrogenation zone 12 include a temperature of about 870° F. and a pressure of about 30 p.s.i.g. Sufficient hydrogen is added to the system so that a mole ratio of hydrogen-to-combined feed of about 8 is maintained. Preferably, approximately 2,000 parts per million of water is present in the combined feed stream to dehydrogenation zone 12. A product stream of corresponding linear olefin hydrocarbons comprising approximately 95% mono-olefins is removed from zone 12 via line 13. of the remaining 5% of the material in line 13 the major portion is diolefinic with minor amounts of aromatic hydrocarbons. A by-product of the dehydrogenation reaction is hydrogen of over 96% purity which is removed from zone 12 by means not shown.

The catalyst which is used in dehydrogenation zone 12 is one which promotes the dehydrogenation of the paraffins to the linear mono-olefins without isomerization of the normal paraffins or the resulting mono-olefins to the corresponding branched chain analog. Suitable catalytic agents which minimize isomerization are the neutral oxides of the elements of Group VI and metal sulfides and/or oxides of the meals of Group VIII of the Periodic Table. The preferable catalyst for dehydrogenating the straight chain paraffin hydrocarbons comprise the noble metals or metal compound such as platinum and/or palladium deposited on a neutral or basic support such as alumina. Those skilled in the art may find a detailed description of suitable catalysts for practicing the dehydrogenation reaction in United Statts Patent 3,432,567 issued Mar. 11, 1969, and the teachings of this reference are incorporated herein to the extent necessary to practice the present invention.

The effluent from dehydrogenation zone 12 in line 13 is admixed with benzene from line 14 and the mixture of linear mono-olefinic hydrocarbons of from 10 to 15 carbon atoms per molecule and benzene is passed via line 15 into first alkylation reaction zone 16. The effluent from the first alkylation reaction zone is withdrawn via line 17 and passed into first separation zone 18 wherein suitable settling is performed in order to separate the used hydrogen fluoride alkylation catalyst phase from the hydrocarbon-containing phase. The use hydrogen fluoride alkylation catalyst is removed from separation one 18 via line 20 and recycled to the first alkylation reaction zone in admixture with the feed in line 15. A drag stream of relatively spent acid catalyst is withdrawn, as necessary, from line 20 and passed via line 21 into catalyst regeneration zone 22.

The operating conditions necessary for catalyst regeneration are well known to those skilled in the art and is normally accomplished by hydrocarbon vapor stripping of the acid catalyst under conditions sufficient to decompose alkylfluorides and to remove as a vapor product regenerated acid catalyst. The residual tarry material is withdrawn from catalyst regeneration zone 22 via line 23 and passed into disposal not shown. The regenerated catalyst (herein also termed fresh catalyst) is withdrawn from regeneration zone 22 and passed via line 24 into admixture with the hydrocarbon-containing phase being passed from separation zone 18 via line 19.

Referring again to separation zone 18, the separated hydrocarbon phase now substantially hydrogen fluoride alkylation catalyst-free is withdrawn via line 19 and passed into heating means 26 where its temperature is raised at least 10° F. above the temperature maintained in first alkylation reaction zone 16. The heated hydrocarbon phase and hydrogen fluoride alkylation catalyst having a concentration of from 90 to 100% by weight of hydrogen fluoride is passed via line 33 at a relatively high temperature into second alkylation reaction zone 27. Additional fresh catalyst as needed to keep the system in balance is added to the process via line 25.

The effluent from the second alkylation reaction zone is withdrawn via line 28 and passed into second separation zone 29 wherein conditions are maintained in order to effect a separation between the monoalkylated aromatic hydrocarbon having a bromine index of less than 30 from the second used hydrogen fluoride alkylation catalyst phase. The separated acid phase is withdrawn from separation zone 29 and passed via line 31. A portion passes into second alkylation reaction zone 27 in admixture with the feed to the second alkylation reaction zone in line 33. The remaining portion of the partially deactivated acid catalyst in line 31 is passed via line 32 and line 20 for recycle to first alkylation reaction zone 16. Thus, it is to be noted that the sole source of hydrogen fluoride alkylation catalyst for the first reaction zone is partially deactivated hydrogen fluoride alkylation catalyst which had previously been used in the second alkylation reaction zone. Further, this catalyst is an equilibrium catalyst containing contaminants such as tars.

The hydrocarbon-containing phase from second separation zone 29 is passed via line 30 to the recovery facilities which are well known to those skilled in the art. A monoalkylated aromatic hydrocarbon having a bromine index of less than 30 and, typically, between 10 and 20, is recovered from the material in line 30.

Accordingly, from the description presented herein, it can be seen that one embodiment of the present inventive process is characterized by at least two reaction zones with each zone having its separate circulating hydrogen fluoride alkylation catalyst system and further characterized whereby the hydrogen fluoride alkylation catalyst in the first alkylation reaction zone was obtained solely from the second alkylation reaction zone which is maintained at a temperature at least 10° F. higher than the first alkylation reaction zone in order to reduce the olefin content and the alkylfluoride content of the final mono-alkylated aromatic hydrocarbon product.

Examples

A series of experiments was performed for the production of alkylbenzenes by the alkylation of benzene with straight chain mono-olefins of from 10 to 15 carbon atoms. In the first experiment, designated Run No. 1, the alkylation reaction was effected at 100° F. using anhydrous HF (99 to 100% HF). In a second experiment, designated Run No. 2, the alkylation reaction was effected at 140° F. using the same catalyst and at otherwise similar alkylation reaction conditions; that is, the same source of mono-olefin hydrocarbons, the same HF/olefin ratio, the same benzene/olefin ratio and the same anhydrous HF acid catalyst. In a third experiment (Run No. 3) the alkylation reaction was effected in two stages. The HF acid catalyst in the second stage (in which the hydrocarbon charge is separated hydrocarbon phase of the first stage reaction) is fresh, anhydrous HF and the acid catalyst for the first stage reaction is a 93–94% HF acid, corresponding to the catalyst phase recovered from the reaction product of the second stage of the process, and the second stage is effected at a temperature 10° F. higher than the first stage.

In Run No. 1, 233 ml. of nitration grade, thiophene-free benzene dried to less than 50 p.p.m. water was charged at 70° F. into a water-cooled stirred (1500 r.p.m. impeller) turbomixer reactor cooled to 50° F. by heat exchange coils in the walls of the reactor. After cooling to 50° F. 4000 ml. of anhydrous HF was added and the contents of the reactor then heated to 100° F. With the stirrer speed at 1500 r.p.m. 2000 ml. of n-mono-olefin-paraffin mixture which contained 10% by weight of mono-olefins formed by dehydrogenation of n-paraffins of $C_{10}$ to $C_{15}$ chain length of 174.6 average molecular weight was charged at a uniform rate into the turbomixer over a period of 30 minutes. The contents of the reactor were stirred an additional 15 minutes at 100° F. The pressure in the reactor was from 1 to 3 atmospheres, abs.

In Run No. 2 the same procedure was followed, except that the reactor and its contents were heated to 140° F. as the turbomixer impeller was stirred at 1500 r.p.m. The operation conditions of the reaction are summarized as follows:

|  | Run 1 | Run 2 |
|---|---|---|
| Reaction temp., ° F | 100 | 140 |
| Benzene/olefin, mols | 10/1 | 10/1 |
| HF/hydrocarbon, vol./vol | 2 | 2 |

The contents of the reactor were cooled to 50° F. and the HF phase which separated on standing was withdrawn from below the upper hydrocarbon phase. The latter hydrocarbon phase which contained dissolved HF was neutralized with potassium carbonate. The product was distilled into the following fractions:

(1) Benzene.
(2) A fraction consisting of n-paraffins.
(3) Fraction consisting of alkylbenzenes boiling from 552 to 635° F.

A bottoms residue fraction consisting of higher boiling polyalkylbenzenes remained in the distillation flask.

Examination of the paraffin $C_{10}$–$C_{15}$ fraction recovered indicated that all of the olefin reacted in both runs, the bromine index of both paraffin fractions were less than 2.

The alkylate yield in both runs, based on the olefins reacted was as follows:

| Run | (1) at 100° F. | (2) at 140° F. |
|---|---|---|
| Alkylate yield, percent of olefin charged | 89.6 | 90.6 |
| Wt. of alkylate/wt. of olefin charged | 1.378 | 1.392 |

The quality of the alkylate recovered, however, was somewhat different in each run as follows:

| Run | (1) at 100° F. | (2) at 140° F. |
|---|---|---|
| Bromine Index of alkylate (536–620° F.) | 30 | 14. |
| Fluoride content, p.p.m | 13 | 40. |
| Increase in alkyl side chain branching of alkylate, percent. | 5.2 | 6.6.[1] |
| Color of mono-sulfonate | Light tan [2] | Light cream.[2] |

[1] Increase in branching of side chain indicates loss of biodegradability of detergent product prepared from alkylate.
[2] Color of sulfonated product is a primary quality indicator because of the association of whiteness with cleanliness. The content of olefins in the alkylate fraction (as indicated by the Bromine Index) is, therefore, an inverse measure of alkylate quality, together with the quality relationship of increase alkyl side chain branching which is also inversely related to biodegradability.

Run No. 3 which is an experiment based on the process of this invention wherein the alkylation reaction is effected in two stages, in the first stage of which fresh benzene and fresh olefin charge stocks are contacted with HF catalyst previously used in the second stage reaction and separated from the second stage alkylation mixture. The first stage is effected at 100° F. and the second stage at 110° F., with the separated used HF acid phase from the second stage reaction used as the source of HF acid catalyst for the first stage reaction. To start the process and provide a source of used HF acid catalyst, the used HF acid catalyst from a prior alkylation reaction in which fresh benzene and $C_{10}$–$C_{15}$ olefin (dehydrogenation product of $C_{10}$–$C_{15}$ normal paraffin, containing 10% by volume of n-olefins) were alkylated in an alkylation reaction using a 10/1 benzene/olefin ratio and in which fresh 100% HF acid was used as catalyst at an HF/total hydrocarbon ratio of 2/1, at a pressure of 3 atm. abs. and with an average contact time between acid and hydrocarbon of 4.5 minutes.

The products of the above reaction were separated to recover a used HF acid phase which contains 93 weight percent HF, 1.2 weight percent water and 5.8 weight percent hydrocarbon.

The first stage of Run 3 was started using the HF acid phase of 93% HF recovered from the above alkylation reaction and thereafter from the second stage reaction mixture of the 2-stage process. Benzene of nitration grade quality (233 ml.) was charged into the turbomixer reactor (1500 r.p.m. stirrer) at 70° F. cooled to 50° F. and then mixed with 4100 ml. of used HF alkylation acid recovered from the above acid preparation. The mixture was heated to 100° F. and with the stirrer speed at 1500 r.p.m., 2000 ml. of n-mono-olefin of $C_{10}$ to $C_{15}$ chain length (average M.W. of 174.6) was charged at a uniform rate into the turbomixer over 30 minutes, followed by additional stirring for 15 minutes at 100° F. The pressure was maintained at from 3 to 4 atm. abs.

Thereafter, the reaction mixture was separated into a hydrocarbon upper layer and a used acid catalyst lower layer which was drained away for regeneration of the HF catalyst. The hydrocarbon phase was again stirred at 1500 r.p.m. as 4000 ml. of 100% HF catalyst was added uniformly at 110° F. over a period of 10 minutes, followed by stirring at 110° F. for 6 minutes.

Thereafter the used acid catalyst phase was withdrawn from the reactor and reserved for the next run in which the catalyst is used for the first stage of the reaction. The hydrocarbon upper layer phase is washed with water containing $K_2CO_3$ to neutralize dissolved HF and thereafter dried over anhydrous $K_2CO_3$.

Distillation of the second stage reaction product, first at atmospheric pressure to recover excess benzene and n-paraffins and thereafter at 2 mm. Hg pressure to recover the alkylbenzene product from a distillation residue consisting of alkyl and dialkyl tetralins, naphthenes and other higher boiling products. The product fraction boiling at 536 to 620° F. (corr. to atm. pressure) was produced in a yield of 91.3 percent by weight, based on the weight of olefin charged. This alkylate has a bromine index of less than 2 and contains 8 p.p.m. of fluoride. An increase in side chain branching of 5.4% was noted. When sulfonated with 20% oleum at 32 to 50° F. and neutralized with sodium hydroxide, the alkylate yielded a sodium alkylbenzene sulfonate detergent of almost white color which was biodegradable.

I claim as my invention:

1. A process for the production of a monoalkylated aromatic hydrocarbon having a bromine index of less than 30 which comprises the steps of:
   (a) alkylating at alkylation conditions including a temperature in the range of from 40° F. to 120° F. an aromatic hydrocarbon with a linear mono-olefinic hydrocarbon of from 10 to 15 carbon atoms per molecule in a first alkylation reaction zone containing hereinafter specified used hydrogen fluoride alkylation catalyst so that at least 98% by weight, but less than 100% by weight of said mono-olefinic hydrocarbon is reacted;
   (b) passing the entire first alkylation reaction effluent into a first separation zone under conditions sufficient to produce a hydrocarbon-containing phase and a used hydrogen fluoride alkylation catalyst-containing phase;
   (c) recycling a major portion of the separated used hydrogen fluoride alkylation catalyst-containing phase to the first alkylation reaction zone of step (a) and passing the remaining portion of said catalyst-containing phase into a hydrogen fluoride catalyst regeneration zone to produce a fresh hydrogen fluoride alkylation catalyst having a concentration of from 90 to 100% by weight hydrogen fluoride;
   (d) introducing the separated hydrocarbon-containing phase of step (b) and the fresh hydrogen fluoride alkylation catalyst of step (c) into a second alkylation reaction zone maintained at alkylation conditions including a temperature in the range of from 80° F. to 150° F., said temperature being at least 10° F. higher than the temperature maintained in said first alkylation reaction zone, thereby completely reacting the remaining mono-olefinic hydrocarbon;
   (e) passing the entire second alkylation reaction effluent into a second separation zone maintained under conditions sufficient to separate monoalkylated aromatic hydrocarbon having a bromine index of less than 30 from a second used hydrogen fluoride alkylation catalyst phase;
   (f) recycling a portion of the separated second used hydrogen fluoride alkylation catalyst phase of step (e) to said second alkylation reaction zone in admixture with the fresh hydrogen fluoride alkylation catalyst of step (c) and recycling the remaining portion of said second used hydrogen fluoride alkylation catalyst to said first alkylation reaction zone in admixture with said used hydrogen fluoride catalyst of step (c) to form the used hydrogen fluoride alkylation catalyst of step (a); and
   (g) recovering monoalkylated aromatic hydrocarbon having a bromine index of less than 30.

2. The process according to claim 1 wherein said alkylation conditions of step (a) and said alkylation conditions of step (d) include a residence time in the range of from 5 to 25 minutes and a hydrogen fluoride alkylation catalyst-to-hydrocarbon volume ratio of from 0.2:1 to 10:1.

3. The process according to claim 2 wherein said aromatic hydrocarbon is a benzene hydrocarbon.

4. The process according to claim 3 wherein said benzene hydrocarbon is benzene.

5. The process according to claim 1 wherein additional fresh hydrogen fluoride alkylation catalyst is admixed with said regenerated fresh hydrogen fluoride alkylation catalyst of step (c) for introduction into said second alkylation zone.

6. The process according to claim 1 wherein said used hydrogen fluoride alkylation catalyst of step (a) as specified in step (f) comprises the sole source of hydrogen fluoride alkylation catalyst to said first alkylation reaction zone.

References Cited

UNITED STATES PATENTS

| | | | |
|---|---|---|---|
| 2,740,807 | 4/1956 | Rappen et al. | 260—671 X |
| 3,355,508 | 11/1967 | Moulden | 260—671 |

DELBERT E. GANTZ, Primary Examiner

C. R. DAVIS, Assistant Examiner